United States Patent [19]

Skakunov

[11] 4,146,162
[45] Mar. 27, 1979

[54] ARRANGEMENT FOR MANUFACTURING SPHERICAL RESERVOIRS

[76] Inventor: Mikhail G. Skakunov, stantsia Levoberezhnaya, ulitsa Zelenaya, 6, kv. 60, Moskovskaya oblast, U.S.S.R.

[21] Appl. No.: 858,269

[22] Filed: Dec. 7, 1977

[51] Int. Cl.² .................................................. B23K 31/02
[52] U.S. Cl. ....................................... 228/6 R; 228/29; 228/47; 228/48; 219/125.1
[58] Field of Search ............... 228/25, 29, 32, 47, 48, 228/184, 4.1, 6 R; 219/125.1

[56] References Cited

U.S. PATENT DOCUMENTS

| | | | |
|---|---|---|---|
| 1,740,033 | 12/1929 | Pinckney | 228/48 X |
| 1,940,785 | 12/1933 | Boardman | 228/48 X |
| 3,220,629 | 11/1965 | Anderson | 228/25 |
| 3,243,094 | 3/1966 | Lucas, Jr. | 219/125.1 X |

*Primary Examiner*—Al Lawrence Smith
*Assistant Examiner*—K. J. Ramsey
*Attorney, Agent, or Firm*—Burgess, Ryan and Wayne

[57] ABSTRACT

Arrangement for manufacturing spherical reservoirs from meridional petal-like flaps, wherein the base has mounted thereon a supporting frame for the reservoir, and, successively overlying this frame: a shaft for accommodating the lids of the reservoir and for rotating the latter in the process of its manufacture, and a welding unit accommodated on a support beam. The shaft is journalled on posts mounted on the base, for rotation about a horizontal axis, while the supporting frame has a curvilinear surface for the meridional flaps to be placed thereupon, the shape of this surface corresponding to the curvilinear surface of the meridional flaps, the frame being carried by vertical guides for motion therealong, to bring the meridional flaps to the lids of the reservoir. The support beam has arcuate guideways of a radius somewhat greater than that of the sphere of the reservoir, to accommodate the welding unit for motion along the guideways in the course of welding the reservoir. The arrangement of the present invention is highly efficient and structurally simple; it provides for performing the entire production sequence of assembling a reservoir, while not requiring great production space for its accommodation.

5 Claims, 4 Drawing Figures

ARRANGEMENT FOR MANUFACTURING SPHERICAL RESERVOIRS

FIELD OF USES OF INVENTION

The invention relates to arrangements for manufacturing spherical reservoirs from a plurality of meridional petal-like flaps.

The arrangement of the present invention can be efficiently utilized for manufacturing spherical reservoirs from precut meridional flaps, either relatively thin and originally flat, or else relatively thick and shaped by pressing, following their cutting out, to a double curvature.

PRIOR ART AND ITS DISADVANTAGES

There are known arrangements for welding spherical reservoirs, wherein a base has mounted thereon a supporting frame for a reservoir to be welded, made up of two portions, viz. of a stationary one and of a movable one.

The movable portion of the supporting frame of the known arrangement is an arcuate member having the ends thereof interconnected by a shaft adapted to accomodate the lids and the body of the reservoir, pre-assembled in another arrangement and requiring final welding.

Mounted to overlie the supporting frame is a welding unit immovably mounted on a support beam connected with the base.

The movable portion supporting the reservoir pre-assembled from the flaps is mounted on the stationary portion of the supporting frame for rotation in a vertical plane, so as to provide for the welding of the entire length of a joint defined by the adjacent flaps of the reservoir.

The shaft is operatively coupled with a drive adapted to rotate it about a horizontal axis, and thus to rotate the reservoir, whereby the joints between the adjacent flaps of the reservoir are successively brought to the welding unit.

The known arrangements are solely capable of final welding of a reservoir pre-assembled in other arrangements.

Therefore, the entire process of manufacturing a reservoir requires several arrangements, which impairs the efficiency of the manufacturing process, involves greater production space and increases the amount of metal in the production facilities.

Furthermore, when a reservoir assembled from meridional petal-like flaps just provisionally secured together by spot welding is transferred from one arrangement into another one, more often than not additional work is required to make good its local deformation, which further affects the efficiency of the manufacturing process.

OBJECTS AND BRIEF DESCRIPTION OF THE INVENTION

It is an object of the present invention to provide an arrangement for manufacturing spherical reservoirs, which should have expanded production capacities and wherein the supporting frame for the reservoir and the support beam for accomodating the welding unit should be of a structure which, while relatively simple, should provide for performing in a single arrangement the assembling and welding of a completed reservoir made of individual elements, i.e., of meridional petal-like flaps.

It is another object of the present invention to step up the efficiency of the production process of manufacturing spherical reservoirs.

It is a further object of the present invention to simplify the production process of manufacturing spherical reservoirs.

It is still another object of the present invention to reduce the amount of the production space required for the manufacture of spherical reservoirs.

It is yet another object of the present invention to reduce the amount of metal in a plant for manufacturing spherical reservoirs.

It is a still further object of the present invention to provide for manufacture of reservoirs having enhanced operational properties, such as their fluid-tightness and strength.

With these and other objects in view, there is herein disclosed an arrangement for manufacturing spherical reservoirs from meridional petal-like flaps, wherein a base has mounted thereon a supporting frame for a reservoir and, successively overlying this frame, a shaft for accomodation of the lids of the reservoir and for rotating the latter in the process of its manufacture, and a welding unit supported by a support beam, in which arrangement, in accordance with the present invention, the shaft is journalled on posts secured to the base, for rotation about a horizontal axis, while the supporting frame has a curvilinear surface shaped to correspond to the shape of the curvilinear surface of the meridional flaps and is carried by vertical guides, for motion therealong, to bring the meridional flaps to the lids of the reservoir, the support beam having arcuate guideways of a radius somewhat greater than the radius of the sphere of the reservoir, for accomodation of the welding unit adapted to move along these guideways in the course of welding the reservoir.

It is expedient that one of the vertical guides of the supporting frame should have mounted thereon a member limiting the travel of the supporting frame, spaced from the shaft by a distance substantially equal to the radius of the lid of the reservoir being manufactured.

This would enhance exact positioning of a meridional flap on the curvilinear surface of the supporting frame, while the former has its ends welded to the lids of the reservoir.

It is not less expedient that the support beam with the arcuate guideways should be mounted on one of the posts supporting the shaft, for rotation relative thereto in a horizontal plane.

This would enable to have sufficient space for removing a completed reservoir from the arrangement.

It is further expedient that the other one of the posts supporting the shaft should have mounted thereon for rotation in a horizontal plane a cantilever beam having guideways for accomodation of a driven trolley carrying a load-handling mechanism adapted to lift meridional flaps and to place them onto the curvilinear surface of the supporting frame, and also to remove a completed reservoir.

The incorporation in the arrangement of a load-handling mechanism would enable to bring machinisation into the operations of placing the meridional flaps and of removing a completed reservoir, and also to reduce the production space requirements and to cut down the time of making a reservoir.

It is also expedient that the driven trolley should be operatively connected through a flexible element with the welding unit, for moving same along the arcuate guideways.

This would obviate the need in an individual drive for the welding unit and enable to simplify the structure of the entire arrangement, and also to reduce its weight and energy consumption.

An arrangement for manufacturing spherical reservoirs in accordance with the present invention, although of a relatively simple structure, provides for performing both assembling of a reservoir from individual flaps, with provisional welding of the joints therebetween in localized areas, and final welding to a final fluid-tight condition.

The arrangement offers a high efficiency, occupies a relatively small amount of production space and significantly simplifies the process of manufacturing a reservoir.

BRIEF DESCRIPTION OF DRAWINGS

Following hereinbelow is a description of an embodiment of the present invention, with reference being had to the accompanying drawings, wherein.

DETAILED DESCRIPTION OF EMBODIMENT

Figure 1:
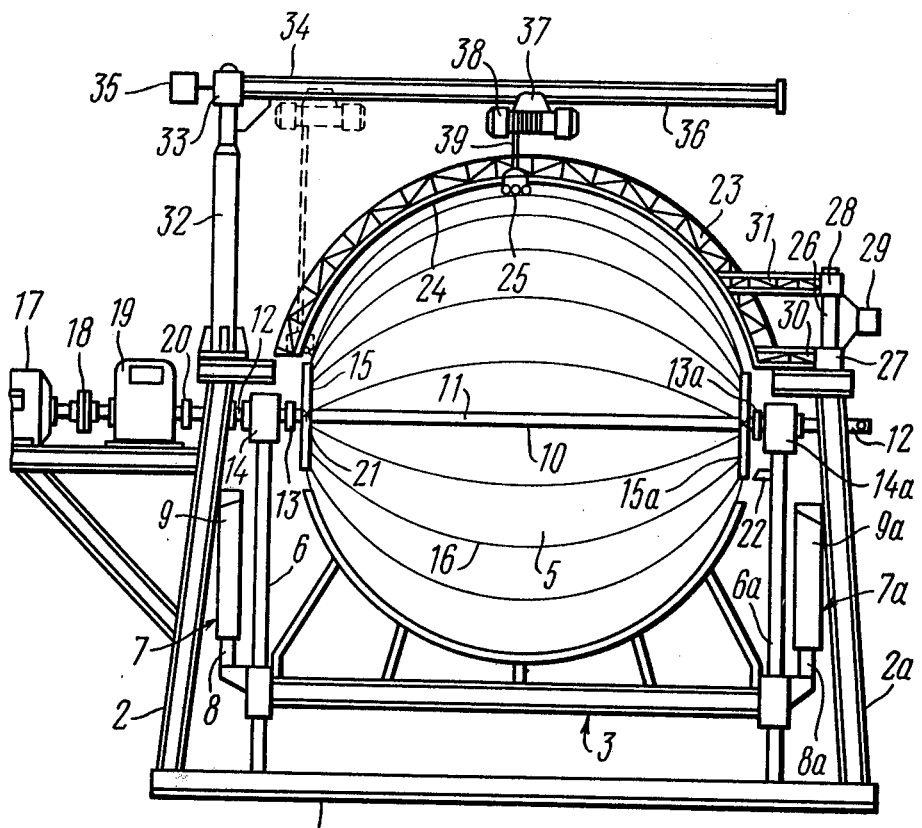
FIG. 1 is a general front view of an arrangement for manufacturing spherical reservoirs, in accordance with the invention.
Figure 2:
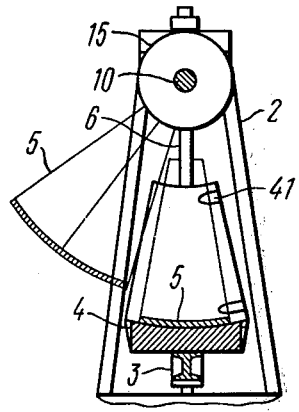
FIG. 2 is a sectional view taken on line II—II of FIG. 1.

Referring now in particular to the appended drawings, the arrangement for manufacturing spherical reservoirs comprises a base 1 (FIG. 1) having mounted thereon posts 2 and 2a and a supporting frame 3 hereinafter referred to as "the frame." The frame 3 has a curvilinear surface 4 (FIGS. 1 and 2) shaped to correspond to the curvilinear surface of the meridional flaps 5 of a completed reservoir, i.e. having double curvature (in the longitudinal and transverse directions).

The base 1 has secured thereto vertical guides, 6, 6a (FIG. 1) carrying thereon the frame 3 reciprocable therealong in a vertical direction. Reciprocation of the frame 3 along the vertical guides 6 and 6a is effected by two driving means 7 and 7a which in the presently described embodiments are in the form of fluid cylinders designated, respectively, 7 and 7a.

The respective movable member 8 (8a) of each fluid cylinder 7 (7a) is connected with the frame 3, and the stationary element 9 (9a) is connected with the post 2 (2a).

Extending between the posts 2 and 2a above the frame 3 is a horizontal shaft 10 made up of a long or main span 11 and two shorter terminal portions 12 and 12a, the shorter terminal portions 12 and 12a being coupled with the main span 11 by respective couplings 13, 13a and being journalled for rotation in bearings 14 and 14a supported by the respective vertical guides 6 and 6a.

The main span 11 of the shaft, is adapted to accomodate thereon the opposite lids 15 of a spherical reservoir 16 being manufactured, to be hereinafter referred to as "the reservoir" and for rotation of the latter in the process of its manufacturing.

The multicomponent shaft 10 is associated with a drive including an electric motor 17, a coupling 18 and a reducer 19, and a means 20 for transmitting incremental rotation through successive angles 360°/n, where "n" is the number of the meridional flaps in the reservoir being manufactured, the means 20 being in the form of a Geneva cross, or else in any other suitable known form.

To transmit the rotation of the shaft 10 to the lids 15 of the reservoir, there can be employed either a key-and-slot connection 21 (schematically indicated in the drawing), or any other suitable means designed for this purpose.

The vertical guides 6a of the frame 3 has mounted thereon, spaced from the shaft 10 by a distance substantially equalling the radius of the lid 15 of the reservoir, a travel-limiting member 22 which in the presently described embodiment is a limit switch connected with the drive means 7 and 7a and thus adapted to limit the vertical travel of the frame 3 toward the lids 15 of the reservoir.

The post 2a has mounted thereon a support beam 23 (FIG. 1) with arcuate guideways 24 adapted to accomodate a welding unit 25. The radius of the arcuate guideways 24 is somewhat greater than that of the sphere of the reservoir 16. The welding unit 25 is adapted to travel along these guideways 24, e.g. on rollers (which are not shown in the drawings for clarity).

The support beam 23 (to be hereinafter referred to as "the beam") is also of an arcuate shape. The beam 23 is pivotable on the post 2a in a horizontal plane, about a pivot axle 26 mounted on the post 2a. The axle 26 has mounted thereon freely rotatable bushes 27 and 28 associated with a drive 29 (schematically shown in the drawings) for effecting their rotation. The drive and the driving connection can be of any suitable known structure. The bushes 27 and 28 are coupled with the beam 23 via brackets 30 and 31, respectively.

The post 2 has mounted thereon a stem 32 having pivotably mounted thereon, with aid of a rotatable bush 33, a horizontal cantilever beam 34 rotatable in a horizontal plane by being operatively connected with a drive 35 (schematically indicated in the drawings) of any suitable known structure.

The cantilever beam 34 has guideways 36 accomodating a reciprocable driven trolley 37 remotely controlled from ground level.

Figure 3:
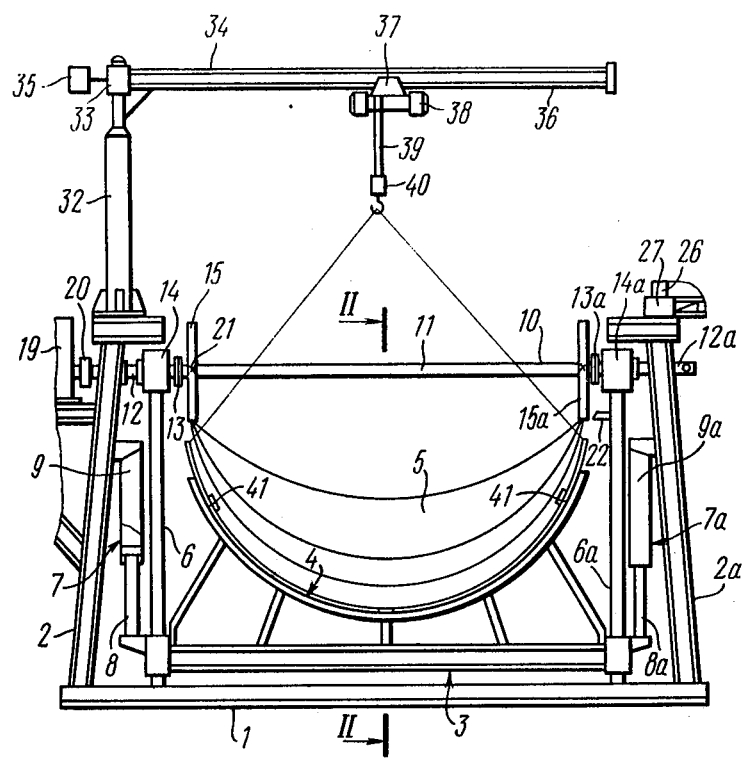
FIG. 3 shows the arrangement for manufacturing spherical reservoirs in the initial position of an operating cycle.

The driven trolley 37 carries a winch 38 with a flexible element 39 connected with a load-handling or load-engaging mechanism 40 (FIG. 3) which in the presently described embodiment is in the form of a hook.

The load-engaging mechanism 40 mounted with aid of the trolley 37 on the cantilever beam 34 rotatable in a horizontal plane is intended to engage meridional flaps 5 outside the arrangement and to place them onto the curvilinear surface 4 of the frame 3, and also to remove a completed reservoir from the arrangement.

To ensure that the ends of a meridional flap 5 snugly fit the curvilinear surface 4 of the frame 3, the latter has mounted thereon pivoted retaining members 41 permitting limited displacement of a meridional flap 5 along the curvilinear surface 4 when one of the edges of the meridional flap 5 engages the limiting member 22 during the vertical upward travel of the frame 3.

To reciprocate the welding unit 25 along the arcuate guide ways 24, the presently-described arrangement uses the same driven trolley 37 and the winch 38 of which the flexible element 39 is connected with the welding unit 25.

The drive effecting reciprocation of the welding unit 25 along the guideways 24 may be, however, of any other known structure, suitable for the purpose.

The herein described arrangement for manufacturing spherical reservoirs is operated, as follows.

Let us first describe the operation of manufacturing a spherical reservoir from pre-cut originally flat meridional petal-like flaps.

The support beam 23 with the welding unit 25 carried thereby and the beam 34 carrying the load-engaging mechanism 40 are initially pivoted aside, outside the arrangement.

A flat meridional flap 5 is suspended from the hook of the load-engaging mechanism 40 so that it bends under its own weight, and in this bent state the beam 34 with the load-engaging mechanism 40 is operated to hoist the flap 5 and to place it onto the curvilinear surface 4 of the supporting frame of the arrangement, by engaging and disengaging at appropriate moments the drive 35 rotating the beam 34.

In this case, the meridional flap 5 becomes bent longitudinally, following the curvature of the surface 4 of the supporting frame 3 in the same direction.

Should the edges of the meridional flap 5 be deformed by a stress residing from the bending, while suspended, to a degree that they would not hug the curvilinear surface 4 of the supporting frame 3, the members 41 are pivoted to engage these edges or end portions, and thus to ensure that the meridional flap 5 snugly fits the curvilinear surface 4 along the entire length thereof.

The supporting frame 3 with the meridional flap 5 firmly engaging it is lifted by the drives 7 and 7a being engaged.

While moving upwardly, one of the edges of the meridional flap 5 as the first to encounter the respective lid 15 of the spherical reservoir-to-be, by engaging either directly the bottommost point of the lid 15, or else the travel-limiting member 22. In the first case, the drives 7 and 7a are overloaded by the ensuing resistance, so that they are automatically disengaged in any suitable known manner, and the supporting frame 3 is halted. In the second case, it is the travel-limiting member 22 which sends a command to disengage the drives 7 and 7a and thus to halt the frame 3.

When the either end of the meridional flap 5 engages the edge of the respective lid 15, the meridional flap 5 becomes aligned on the curvilinear surface 4 of the supporting frame in the longitudinal direction — and its other end or edge engages the edge of the other lid 15.

In this position the ends of the meridional flap 5 are provisionally locally welded manually to the lids 15.

Then the drives 7 and 7a are engaged to lower the now empty frame 3 along the vertical guides 6 and 6a into its lowermost initial position.

Simultaneously, the drive 17 of the shaft 10 is engaged to drive the latter through an angle 360°/n where "n," as it has been already explained, is the number of the meridional flaps making up the reservoir.

Then the abovedescribed cycle of placing the successive meridional flap 5 is repeated.

The cycle ends with this successive meridional flap 5 being brought against the lids 15 and provisionally secured thereto by manual welding. Besides, this successive flap 5 is provisionally secured at several points therealong to the previous meridional flap by manual welding, either internally or externally of the reservoir.

Should the two meridional flaps fail to snugly engage each other throughout their length, the shaft 10 is rotated through a corresponding small angle to ensure their snug engagement.

The cycles of positioning and provisionally securing the meridional flaps by manual welding are repeated, with placing the successive flaps onto the curvilinear surface 4, until the contour of the reservoir is closed in the transverse direction.

Following the placing of the last meridional flap, the cantilever beam 34 is left to overlie the frame, whereas the supporting frame 3 itself is lowered into its initial position. Then the support beam 23 with the welding unit 25 is rotated from its initial position outside the arrangement to overlie the frame 3, by its drive 29 being operated.

The welding unit 25 is driven along the arcuate guideways 24 into the extreme left (in the drawings) position, by connecting it with aid of the flexible element 39 to the remotely controlled trolley 37 on the cantilever beam 34. In this way the welding unit 25 is prepared for the welding operation.

Then the drive 17 of the shaft 10 is engaged to bring one of the joints of the semi-finished reservoir against the welding member of the welding unit 25 occupying its initial position at the left (in the drawings) of the support beam 23.

The welding unit 25 is started. Simultaneously the driven trolley 37 is operated to drive the welding unit 25 through the flexible element 39 along the arcuate guideways 24 of the beam 23. In this manner the welding of one external joint of the reservoir is performed.

Then, the shaft 10 is rotated through 360°/n where "n" is the number of the meridional flaps making up the reservoir, so that the successive joint of the semi-finished reservoir is brought against the welding unit 25 which is now at the right (in the drawings) end of the support beam 23. The drive of the remotely controlled trolley 37 is engaged in the reverse direction, and the welding unit 25 is driven through its working travel along the arcuate guideways 24 from right to left, to weld the successive joint of the reservoir.

Following the completion of the welding of the second joint, the welding unit 25 is once more at the left extremity of the arcuate guideways 24, whereafter the shaft 10 is rotated once more through 360°/n, by engaging its drive 17. In this way, by reciprocating the welding unit 25 through successive working travels from right to left and from left to right, all the external joints of the reservoir are finally welded.

Following the completion of the automatically performed welding sequence, the support beam 23 with the welding unit 25 is pivoted outside the arrangement. The supporting frame 3 is lifted against the reservoir, and liquid under pressure is fed into the latter, whereby the meridional flaps 5 are deformed transversely, in which way the spherical reservoir is finally shaped, which is manifested by the meridional flap engaging the curvilinear surface 4 of the frame 3 during this hydraulic expansion hugging this surface in both directions, i.e., acquiring double curvature.

The hydraulic expansion is also the means of testing the quality of the welding.

Then the supporting frame 3 is lowered to clear the reservoir.

Figure 4:
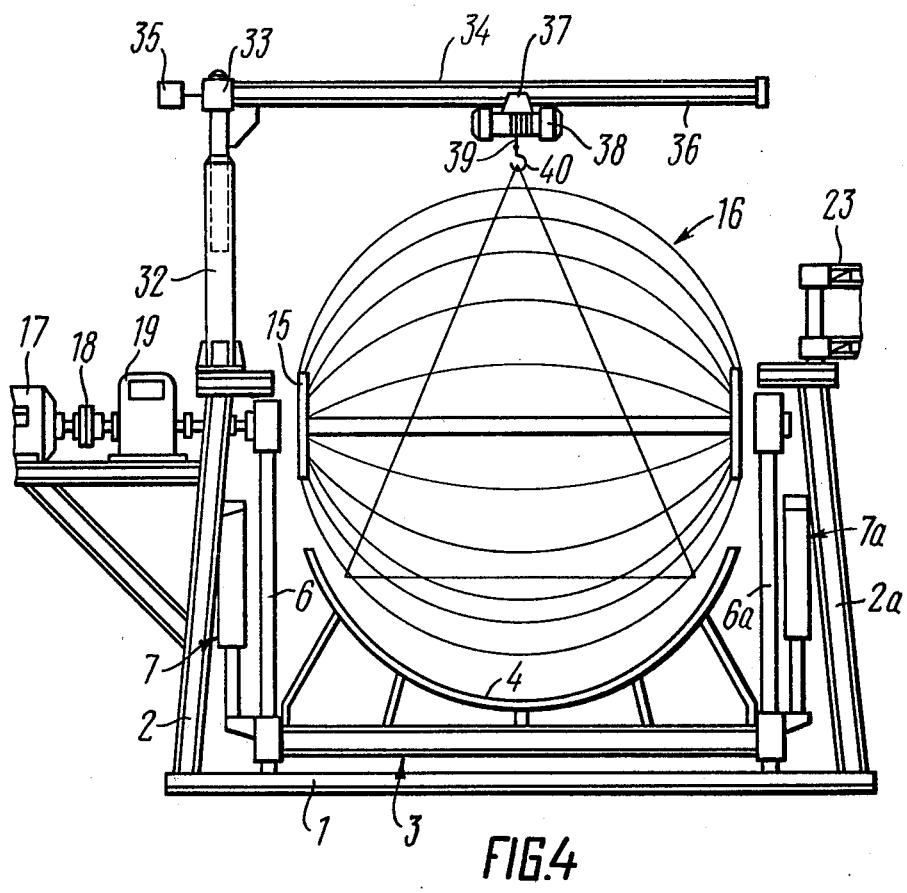
FIG. 4 shows the arrangement for manufacturing spherical reservoirs in the position of its components, corresponding to removing a manufactured spherical reservoir.

The reservoir is attached with ropes to the hook of the load-engaging mechanism 40, as shown in FIG. 4. The couplings 13 and 13a are undone.

Then the beam 34 with the load-engaging mechanism 40 and the reservoir suspended therefrom is pivoted outside the arrangement. Then the main span 11 of the shaft 10, connected with aid of the key-and-slot connection 21 with the lids 15 of the reservoir, is driven off the reservoir by applying a sufficient effort to this main span 11 at one of its ends. The openings in the lids 15, left after the removal of the main span 11 of the shaft 10, are welded, and the reservoir is fit for service.

A spherical reservoir made from relatively thin, originally flat meridional flaps can be made integral with a hollow central post enhancing the rigidity of the thin-wall reservoir. In this case the abovementioned shaft is hollow to serve as this hollow post, and at the end of the manufacturing sequence it is not removed from the reservoir, its ends protruding beyond the reservoir being cut off, e.g. by flame cutting.

A spherical reservoir is manufactured from relatively thick petal-like flaps in a sequence of operations basically similar to the one described hereinabove. However, the process of manufacturing a reservoir from meridional thick-wall flaps pre-shaped by pressing in other arrangements is more labour-consuming in comparison with the process of manufacturing a reservoir from thin-wall flaps with subsequent hydraulic expansion.

Thus, the abovedescribed arrangement can be used for manufacturing spherical reservoirs from both relatively thick meridional flaps of double curvature (pre-shaped either by hammering or by pressing) and thin, originally flat meridional flaps with subsequent hydraulic expansion and testing the fluid-tightness of the welded joints.

The herein disclosed arrangement for making spherical reservoirs from individual meridional flaps is efficient and performs a relatively simple production process accompanied by a fluid-tightness test. It occupies relatively small floor space and has a moderate amount of metal in its structure, whereby it is operable both under factory conditions and directly in situ, on an installation site.

What is claimed is:

1. An arrangement for manufacturing a spherical reservoir defined by a plurality of meridional petal-like flaps and lids, comprising: a base; posts secured to said base; a shaft supported between said posts for rotation about a horizontal axis; means for rotating said shaft, said shaft being adapted to accomodate said lids of a spherical reservoir and to rotate the latter in the course of its assembling; vertical guides secured to said base; a supporting frame carried by said vertical guides, underlying said shaft; a curvilinear surface provided on said supporting frame, said curvilinear surface being shaped to correspond to the shape of the curvilinear surface of said meridional flaps and adapted to accomodate said flaps, said supporting frame being reciprocable along said vertical guides, to bring said meridional flaps to said lids and to support the reservoir during the assembling thereof; means for effecting reciprocation of said supporting frame; a support beam mounted on said base to overlie said shaft; arcuate guideways provided on said support beam, having a radius somewhat greater than the radius of the sphere of the reservoir being manufactured; a welding unit accomodated on said arcuate guideways and reciprocable therealong in the course of welding the reservoir; means for effecting reciprocation of said welding unit.

2. An arrangement as set forth in claim 1, wherein one of said vertical guides of said frame has mounted thereon means for limiting the travel of said supporting frame, spaced from said shaft by a distance substantially equal to the radius of said lid of the reservoir being manufactured.

3. An arrangement as set forth in claim 1, wherein said support beam with said arcuate guideways is mounted on one of said shaft-supporting posts for rotation relative thereto in a horizontal plane.

4. An arrangement for manufacturing a spherical reservoir defined by a plurality of meridional petal-like flaps and lids, comprising: a base; posts secured to said base; a shaft supported between said posts for rotation about a horizontal axis; means for rotating said shaft, said shaft being adapted to accomodate said lids of a spherical reservoir and to rotate the latter in the course of its assembling; vertical guides secured to said base; a supporting frame carried by said vertical guides, underlying said shaft; a curvilinear surface provided on said supporting frame, said curvilinear surface being shaped to correspond to the shape of the curvilinear surface of said meridional flaps and adapted to accomodate said flaps, said supporting frame being reciprocable along said vertical guides, to bring said meridional flaps to said lids and to support the reservoir during the assembling thereof; means for reciprocating said supporting frame; a support beam mounted in a cantilever fashion on one of said posts to overlie said shaft, for rotation relative to said post; means for rotating said support beam in a horizontal plane; arcuate guideways provided on said support beam, having a radius somewhat greater than the radius of the sphere of the reservoir being manufactured; a welding unit accomodated on said arcuate guideways for reciprocation therealong in the course of welding the reservoir; means for reciprocating said welding unit; a beam mounted in a cantilever fashion on the other one of said posts for rotation relative thereto in a horizontal plane; means for rotating said last-mentioned beam; guideways provided on said last-mentioned beam; a driven trolley accomodated on said guideways of said last-mentioned beam; a load-handling mechanism mounted on said driven trolley, adapted for lifting said meridional flaps and placing same on said curvilinear surface of said supporting frame, and for removing a completed reservoir; means for driving said driven trolley along said guideways.

5. An arrangement as set fourth in claim 4, wherein said driven trolley is connected with a flexible element to said welding unit for moving the latter along said guideways accomodating said welding unit.

* * * * *

UNITED STATES PATENT OFFICE
CERTIFICATE OF CORRECTION

Patent No. 4,146,162                           Dated    March 27, 1979

Inventor(s)    Mikhail G. Skakunov

It is certified that error appears in the above-identified patent and that said Letters Patent are hereby corrected as shown below:

Column 4, line 17:   "guides" should be --guide--.

Column 5, line 30:   "residing" should be --resulting--.

Column 8, line 58:   "fourth" should be --forth--.

Signed and Sealed this

Eleventh Day of September 1979

[SEAL]

Attest:

LUTRELLE F. PARKER
Attesting Officer    Acting Commissioner of Patents and Trademarks